United States Patent
Vibhor et al.

(10) Patent No.: US 10,313,196 B2
(45) Date of Patent: Jun. 4, 2019

(54) AUTOMATED GROUPING OF COMPUTING DEVICES IN A NETWORKED DATA STORAGE SYSTEM

(71) Applicant: Commvault Systems, Inc., Tinton Falls, NJ (US)

(72) Inventors: Anand Vibhor, Eatontown, NJ (US); Amey Vijaykumar Karandikar, Long Beach, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 423 days.

(21) Appl. No.: 15/055,073

(22) Filed: Feb. 26, 2016

(65) Prior Publication Data
US 2016/0254963 A1    Sep. 1, 2016

Related U.S. Application Data

(63) Continuation of application No. 14/939,456, filed on Nov. 12, 2015, now abandoned, which is a
(Continued)

(51) Int. Cl.
*H04L 29/02* (2006.01)
*H04L 12/24* (2006.01)
(Continued)

(52) U.S. Cl.
CPC ......... *H04L 41/12* (2013.01); *G06F 11/1458* (2013.01); *G06F 11/1461* (2013.01);
(Continued)

(58) Field of Classification Search
CPC ................................. H04L 67/1097
See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| AU | 2004227949 | 10/2004 |
| CA | 2498174 | 3/2004 |

(Continued)

OTHER PUBLICATIONS

Arneson, "Mass Storage Archiving in Network Environments" IEEE, Oct. 31-Nov. 1998, pp. 45-50.
(Continued)

*Primary Examiner* — Adnan M Mirza
(74) *Attorney, Agent, or Firm* — Knobbe, Martens, Olson & Bear, LLP

(57) ABSTRACT

According to certain aspects, systems and methods are provided for grouping clients together in a networked data storage environment. For instance, clients can be grouped together based on the software installed on the client or the client type. Each client group can be configured to maintain the configuration of clients within the client group. For example, one client group can be configured to ensure that a particular software suite remains up-to-date. Another client group can be configured to ensure that data within a particular directory or on a particular storage device associated with each client of the client group is backed up each night.

21 Claims, 11 Drawing Sheets

Related U.S. Application Data continuation of application No. 13/786,992, filed on Mar. 6, 2013, now abandoned.

(60) Provisional application No. 61/673,423, filed on Jul. 19, 2012.

(51) Int. Cl.
| | |
|---|---|
| H04L 29/08 | (2006.01) |
| G06F 11/14 | (2006.01) |
| G06Q 10/06 | (2012.01) |
| H04W 4/50 | (2018.01) |

(52) U.S. Cl.
CPC ... *G06F 11/1464* (2013.01); *G06Q 10/06313* (2013.01); *H04L 41/0803* (2013.01); *H04L 41/0806* (2013.01); *H04L 41/0889* (2013.01); *H04L 41/0893* (2013.01); *H04L 41/20* (2013.01); *H04L 67/1097* (2013.01); *H04W 4/50* (2018.02); *G06F 2201/84* (2013.01); *H04L 41/048* (2013.01); *H04L 41/082* (2013.01); *H04L 41/22* (2013.01); *H04L 67/34* (2013.01)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 6,944,662 B2 * | 9/2005 | Devine | G06F 17/3089 707/E17.116 |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,343,453 B2 | 3/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,904,126 B2 * | 12/2014 | Ashutosh | G06F 11/1451 711/161 |
| 2006/0224846 A1 | 10/2006 | Amarendran et al. | |
| 2009/0319534 A1 | 12/2009 | Gokhale | |
| 2012/0150818 A1 | 6/2012 | Vijayan Retnamma et al. | |
| 2012/0150826 A1 | 6/2012 | Vijayan Retnamma et al. | |
| 2014/0025796 A1 | 1/2014 | Vibhor et al. | |

FOREIGN PATENT DOCUMENTS

| | | |
|---|---|---|
| DE | 694515115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.

* cited by examiner

AUTOMATED GROUPING OF COMPUTING DEVICES IN A NETWORKED DATA STORAGE SYSTEM

RELATED APPLICATION

This application is a continuation of U.S. application Ser. No. 14/939,456, filed on Nov. 12, 2015 and titled "AUTOMATED GROUPING OF COMPUTING DEVICES IN A NETWORKED DATA STORAGE SYSTEM," the disclosure of which is hereby incorporated by reference in its entirety and which is a continuation of U.S. application Ser. No. 13/786,992, filed on Mar. 6, 2013 and titled "AUTOMATED GROUPING OF COMPUTING DEVICES IN A NETWORKED DATA STORAGE SYSTEM," the disclosure of which is hereby incorporated by reference in its entirety and which claims the benefit of priority under 35 U.S.C. § 119(e) of U.S. Provisional Patent Application No. 61/673,423, filed on Jul. 19, 2012, and titled "AUTOMATED GROUPING OF COMPUTING DEVICES IN A NETWORKED DATA STORAGE SYSTEM," the disclosure of which is hereby incorporated by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

Part of ensuring availability of data includes ensuring that the computers used within the corporate environments are properly maintained and that software resources are kept up-to-date. In addition, to help keep costs within budget, it is important to prioritize the use of resources according to need and importance among other factors. For example, a company may wish to limit the resources used to back up data stored on the company's computers by limiting the frequency of backup of lower priority systems. Further, a company may wish to limit software expense by limiting the number of computers that include a particular software package.

SUMMARY

In view of the above, companies often look for ways to reduce the use of resources, such as human resources, while keeping computing resources up-to-date and running efficiently. As part of this process, companies may restrict the software that can be installed on certain computer systems and may limit the installation of certain software resources to a subset of computer systems. Further, companies may schedule backups of data from different computers at different times or with varying frequency. For example, members of the research and development department may have their systems backed up more frequently than members of the marketing department.

One method to keep track of computing resources and to help ensure that the computing resources are configured correctly and are up-to-date is to create groupings of computer systems that are intended to have the same or similar configuration. The present disclosure describes methods and systems for automatically assigning client computers to a set of pre-defined client groups according to a stored grouping criteria, and for automatically configuring computers based on the client groups to which they are assigned.

In some embodiments, a storage manager is capable of identifying the attributes of a computer or client and grouping the client with other clients that share at least some of the attributes. The types of attributes that may be identified by the storage manager are not limited and may include any attribute relating to the software and/or hardware configuration of the client. For example, the attributes may relate to software running on the particular client computer, such as the installed email client, the installed operating system, application-specific data agents associated with the client, etc., or to hardware associated with the particular client computer, such as the installed amount of RAM, the processor, etc.

The identity of the clients that are grouped together may be stored in a database as a client group along with a set of configuration rules for the client group. The configuration rules may relate to any type of client configuration. For example, the configuration rules may be used to specify what software is installed on a client, when a client is to be backed up, how frequently to backup a client, the type of data to backup from a client, etc. In some cases, the configuration rules may be optional. Further, although clients may be grouped to facilitate common configuration, in some cases, clients may be grouped for tracking purposes without the system applying configuration rules.

In some embodiments, a client that no longer shares the attributes of its client group may be reconfigured so that the client includes the attributes of its client group. Advantageously, in some embodiments, by enabling the system to reconfigure clients to match a set of attributes associated with a client group, the amount of resources required to maintain a client's configuration is reduced. For example, suppose that one attribute of the client group is that all clients within the group have a license to a particular software suite. If at some point in time the client no longer includes the license, the system can automatically renew the license, or, if the license file of the software suite has become corrupted, reinstall the software suite.

In other embodiments, a client that no longer shares the attributes of its client group may be disassociated from the client group. Further, in some cases, the client can be associated with a new client group. For example, suppose that a client is associated with a client group that includes clients located on the East coast of the United States. Now suppose that the client is relocated to the West coast. If one attribute of the client group is that the clients share the same time zone, the moved client may be disassociated from the East coast client group and may be associated with the West coast client group. Advantageously, in some embodiments, the system can automatically reconfigure the client based on its inclusion with the West coast client group. For example, if clients on the East coast are configured to have their data automatically backed up at midnight, and clients on the West coast are configured to have their data automatically backed up at 3:00 am, the configuration of the client which switched client groups may be updated to cause its data to be backed up at 3:00 am instead of midnight.

Certain embodiments described herein include a method for managing a set of client computing devices in a networked storage environment. In some cases, this method includes electronically accessing, from a data store, grouping criteria for grouping a plurality of client computing devices that form a client pool into one or more client groups. The client computing devices may each have at least one software application executing thereon that generates production data. Primary copies of the production data can be stored in primary storage and secondary copies of the production data can be stored in secondary storage that is separate from the primary storage. Further, the method includes comparing, by one or more processors, a set of characteristics associated with a first client of the plurality of client computing devices to the grouping criteria to obtain a first comparison result. Based on the first comparison result, the method can include assigning the first client to a first client group of the one or more client groups. Moreover, the method can include electronically accessing, from a data store, a set of configuration rules associated with the first client group. In addition, the method can include automatically initiating, by one or more processors, the configuration of the first client according to the set of configuration rules.

In certain embodiments, a system for managing a set of client computing devices in a networked data storage environment is disclosed. The system can include data storage configured to store grouping criteria for grouping a plurality of client computing devices that form a client pool into one or more client groups. The client computing devices may each have at least one software application executing thereon that generates production data. Primary copies of the production data may be stored in primary storage and secondary copies of the production data may be stored in secondary storage separate from the primary storage. The data storage may be further configured to store configuration rules for configuring client computing devices. In addition, the system may include one or more processors and a client grouping module executing in the one or more processors. The client grouping module may be configured to electronically access the grouping criteria from the data storage and to compare a set of characteristics associated with a first client of the plurality of client computing devices to the grouping criteria to obtain a first comparison result. Based on the first comparison result, the client grouping module may assign the first client to a first client group of the one or more client groups. Furthermore, the system may include a configuration manager executing in the one or more processors. This configuration manager may be configured to electronically access, from the data storage, a set of configuration rules associated with the first client group and to initiate the configuration of the first client according to the set of configuration rules.

Some embodiments of the present disclosure include a non-transitory physical computer storage comprising computer-executable instructions that, when executed by one or more processors, direct a computing system to perform a method for managing a set of client computing devices in a networked data storage environment. This method can include electronically accessing, from a data store, grouping criteria for grouping a plurality of client computing devices that form a client pool into one or more client groups, the client computing devices each having at least one software application executing thereon that generates production data. Primary copies of the production data may be stored in primary storage and secondary copies of the production data may be stored in secondary storage separate from the primary storage. The method may further include comparing, by one or more processors, a set of characteristics associated with a first client of the plurality of client computing devices to the grouping criteria to obtain a first comparison result. Based on the first comparison result, the method can include assigning the first client to a first client group of the one or more client groups. Further, the method may include electronically accessing, from a data store, a set of configuration rules associated with the first client group and automatically initiating, by one or more processors, the configuration of the first client according to the set of configuration rules.

Some embodiments of the present disclosure can include a method of managing a set of components in a networked data storage system. This method can include accessing, from a data store, grouping criteria for grouping a plurality of components in a networked data storage system into one or more component groups. The components can include computer hardware components, computer software components, or both. Further, the method may include comparing, by one or more processors, a set of characteristics associated with a first component of the plurality of components to the grouping criteria. Based on the comparison, the method can include assigning the first component to a first component group of the one or more component groups.

Certain embodiments of the present disclosure include a method of managing a set of computing devices. This method can include receiving an identity of a characteristic associated with at least one computing device from a set of computing devices. Further, the method may include identifying one or more computing devices associated with the identified characteristic from the set of computing devices. Additionally, the method may include creating a device group associated with the identified characteristic and assigning the one or more computing devices to the device group associated with the identified characteristic.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Systems and methods are described herein for implementing automated client grouping in a data storage system. Examples of such systems and methods are discussed in further detail herein, e.g., with respect to FIGS. 2-7. Automated client grouping may additionally be implemented by information management systems such as those that will now be described with respect to FIGS. 1A-1E. And, as will be described, the componentry for implementing the automated client grouping techniques described herein can be incorporated into and implemented by such systems.
Information Management System Overview With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
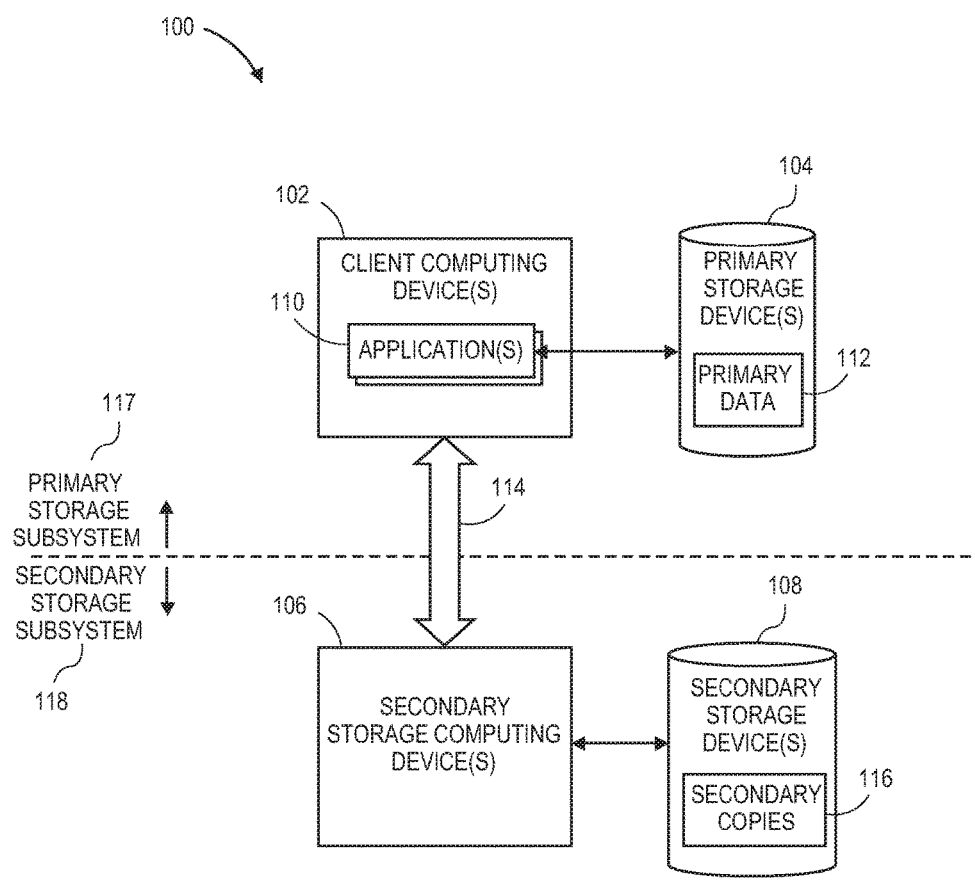
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
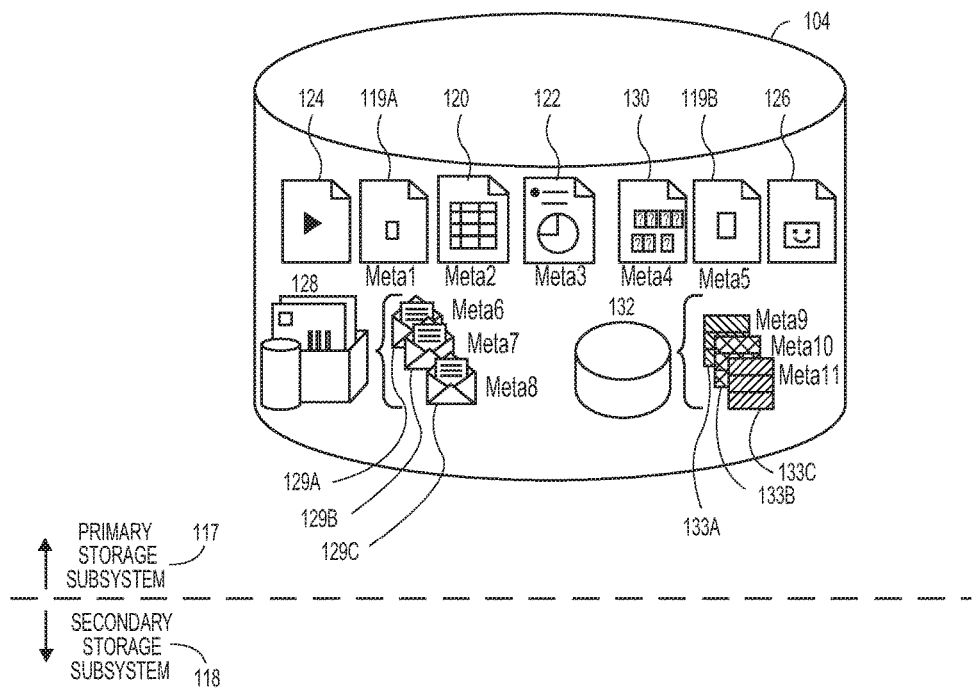
FIG. 1B is a detailed view of a primary storage device, a secondary storage device, and some examples of primary data and secondary copy data.
Figure 1B:
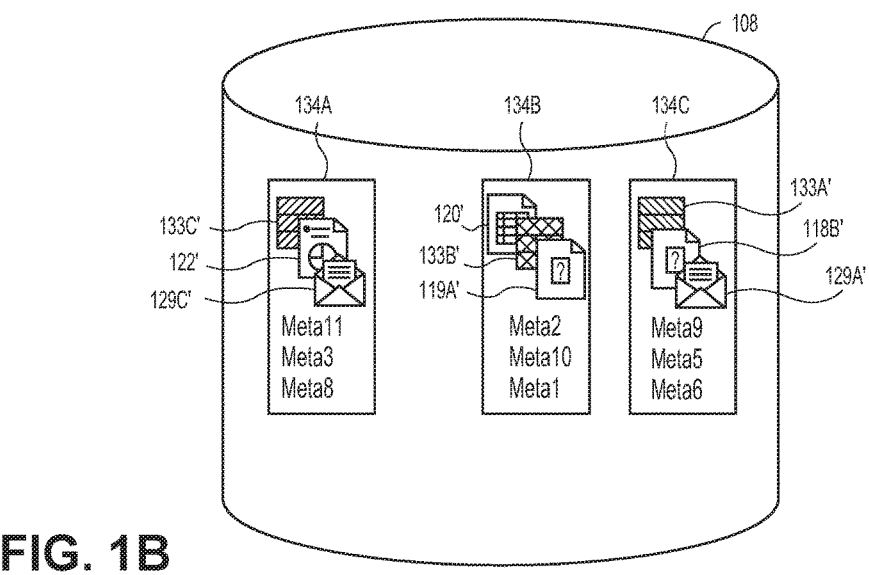

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
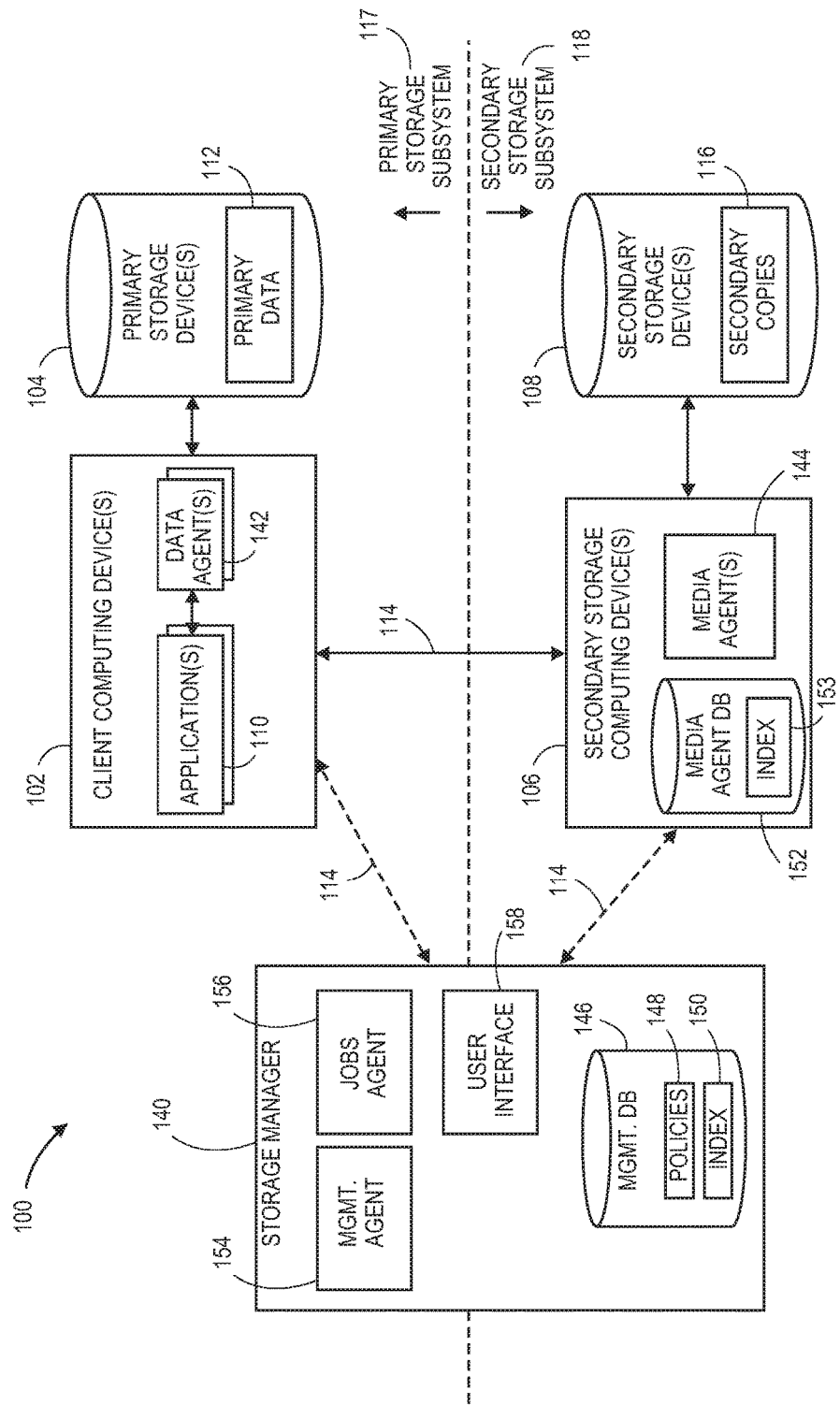
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:

- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
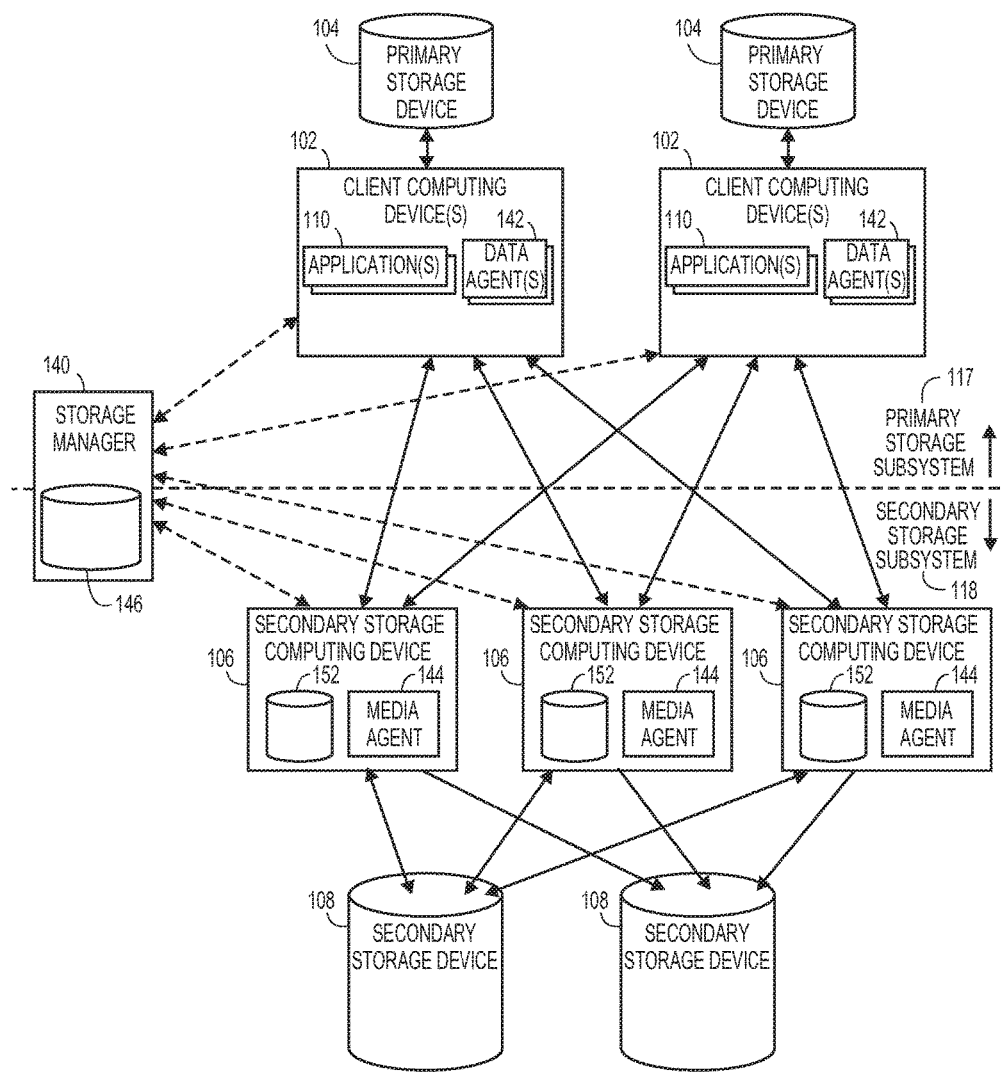
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant"

image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
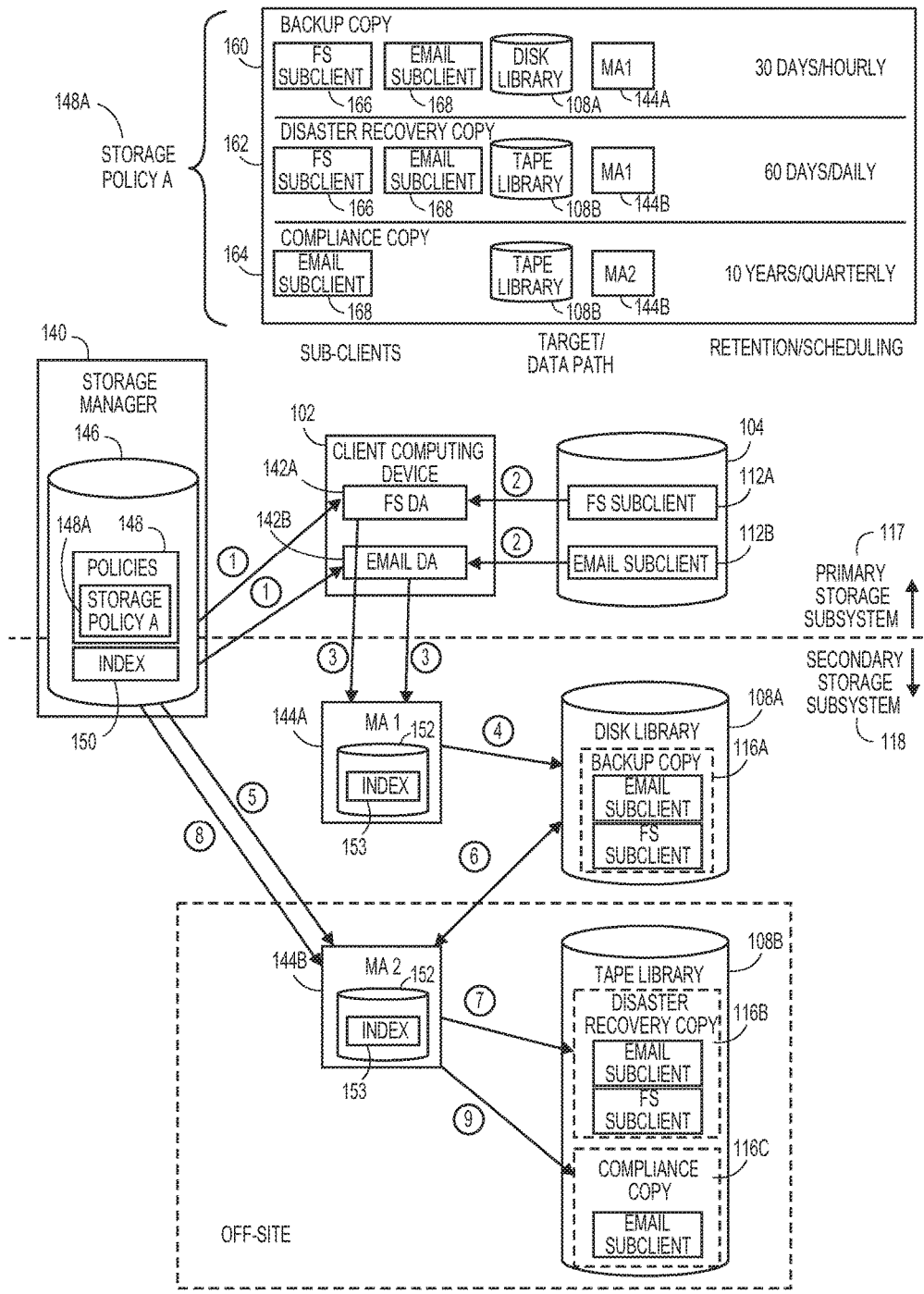
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Example Data Storage Environment for Automated Client Grouping

Figure 2:
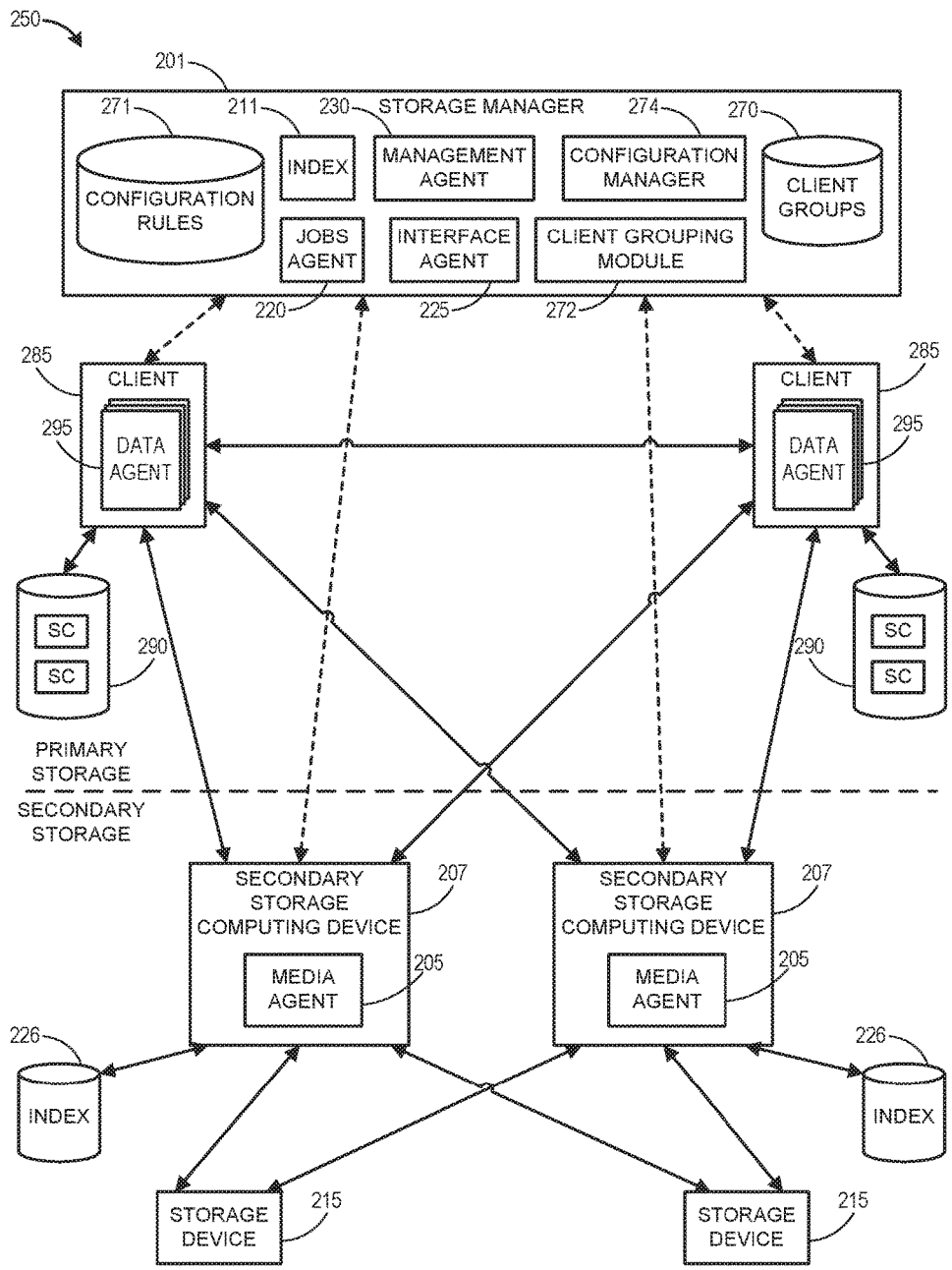
FIG. 2 is a block diagram of an example storage system configured to implement client grouping in accordance with the present disclosure.

FIG. 2 is a block diagram illustrating an example arrangement of resources in a data storage environment. As shown, the data storage system 250 may generally include a storage manager 201, a data agent 295, a media agent 205, a storage device 215, and, in some embodiments, may include certain other components such as a client 285, a data or information store 290, database or index 211, jobs agent 220, an interface module 225, and a management agent 230. Such a system and elements thereof are exemplary of a modular storage system such as the CommVault Simpana system available from CommVault Systems, Inc. of Oceanport, N.J., and further described in U.S. patent application Ser. No. 09/610, 738, now U.S. Pat. No. 7,035,880, which is incorporated herein by reference, in its entirety.

A data storage system, such as the system 250, may generally include combinations of hardware and software components associated with performing storage operations on electronic data. According to some embodiments of the present disclosure, storage system 250 may be related to data storage cells and provide some or all of the functionality of data storage cells as described in U.S. patent application Ser. No. 09/354,058, now U.S. Pat. No. 7,395,282 which is hereby incorporated by reference in its entirety.

In accordance with certain embodiments of the present disclosure, additional storage operations performed by storage systems may include creating, storing, retrieving, and migrating primary storage data (e.g., data stored at information store 290) and secondary storage data (which may include, for example, snapshot copies, backup copies, Hierarchical Storage Management (HSM) copies, archive copies, and other types of copies of electronic data) stored on storage devices 215. In some embodiments, storage systems may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. A storage policy is generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager database or index 211, to archive media as metadata for use in restore operations or other storage operations, or to other locations or components of the system.

In certain embodiments, a schedule policy may specify when to perform storage operations and how often, and may also specify performing certain storage operations on sub-clients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Sub-clients may also be used as an effective administrative scheme of organizing data according to data type, department within the enterprise, storage preferences, combinations of the same or the like.

For example, an administrator may find it preferable to separate e-mail data from financial data using two different sub-clients having different storage preferences, retention criteria, or the like. Storage systems may contain not only physical devices, but also may represent logical concepts, organizations, and hierarchies. For example, a first storage system 250 may be configured to perform a first type of storage operations such as HSM operations, which may include backup or other types of data migration, and may include a variety of physical components including the storage manager 201 (or management agent 230), the media agent 205, the client component 285, and other components as described herein. A second storage system, or cell may contain the same or similar physical components, however, it may be configured to perform a second type of storage operations such as Storage Resource Management (SRM) operations, and may include as monitoring a primary data copy or performing other known SRM operations.

Thus, as can be seen from the above, although the first and second storage cells are logically distinct entities configured to perform different management functions (i.e., HSM and SRM respectively), each cell may contain the same or similar physical devices. Alternatively, in other embodiments, different storage cells may contain some of the same physical devices and not others. For example, a storage system configured to perform SRM tasks may contain the media agent 205, client 285, or other network device connected to a primary storage volume, while a storage cell configured to perform HSM tasks may instead include a media agent 205, client 285, or other network device connected to a secondary storage volume and not contain the elements or components associated with and including the primary storage volume. These two cells, however, may each include a different storage manager that coordinates storage operations via the same media agents 205 and storage devices 215. This "overlapping" configuration allows storage resources to be accessed by more than one storage manager 201 such that multiple paths exist to each storage device 215 facilitating failover, load balancing and promoting robust data access via alternative routes.

Alternatively, in some embodiments, the same storage manager 201 may control two or more cells (whether or not each storage cell has its own dedicated storage manager). Moreover, in certain embodiments, the extent or type of overlap may be user-defined (e.g., through a control console) or may be automatically configured to optimize data storage and/or retrieval.

The client device 285, in certain embodiments, is a computing device including one or more software applications generating production data that is stored in the data storage system 250. For instance, primary copies of the production data can be stored in the information stores 290 associated with the respective client devices 285, and secondary copies of the production data can be stored in one or more of the secondary storage devices 215. The client devices 285 can comprise any appropriate type of computing device, including workstations, personal computers, computerized tablets, PDAs, and other devices suitable for the purposes described herein. In some cases, each client device 285 is associated with one or more users and/or corresponding user accounts. For instance, in one embodiment, where the storage system 250 is implemented in a corporate environment, at least some of the client devices 285 are employee workstations. The data agent 295 may be a software module or part of a software module that is generally responsible for copying, archiving, migrating, and recovering data from client computer 285 stored in an information store 290 or other memory location. Each client computer 285 may have at least one data agent 295 and the system can support multiple client computers 285. In some embodiments, data agents 295 may be distributed between client 285 and storage manager 201 (and any other intermediate components) or may be deployed from a remote location or its functions approximated by a remote process that performs some or all of the functions of data agent 295.

Embodiments of the present disclosure may employ multiple data agents 295 each of which may backup, migrate, and recover data associated with a different application. For example, different individual data agents 295 may be designed to handle Microsoft Exchange data, Lotus Notes data, Microsoft Windows file system data, Microsoft Active Directory Objects data, and other types of data. Other embodiments may employ one or more generic data agents 295 that can handle and process multiple data types rather than using the specialized data agents described above.

If a client computer 285 has two or more types of data, one data agent 295 may be required for each data type to copy, archive, migrate, and restore the client computer 285 data. For example, to backup, migrate, and restore all of the data on a Microsoft Exchange server, the client computer 285 may use one Microsoft Exchange Mailbox data agent 295 to backup the Exchange mailboxes, one Microsoft Exchange Database data agent 295 to backup the Exchange databases, one Microsoft Exchange Public Folder data agent 295 to backup the Exchange Public Folders, and one Microsoft Windows File System data agent 295 to backup the client computers 285 file system. In such embodiments, these data agents 295 may be treated as four separate data agents 295 by the system even though they reside on the same client computer 285.

Alternatively, other embodiments may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, or the like.

Data agents 295 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 201 may be a software module or other application that coordinates and controls storage operations performed by storage system 250. Storage manager 201 may communicate with some or all elements of storage system 250 including client computers 285, data agents 295, media agents 205, and storage devices 215, to initiate and manage system backups, migrations, and data recovery. Although the storage manager 201 is shown as residing in primary storage, the storage manager may generally control components in both primary storage and secondary storage subsystems, as shown and described with respect to FIG. 1D.

Storage manager 201 may include a jobs agent 220 that monitors the status of some or all storage operations previously performed, currently being performed, or scheduled to be performed by storage operation cell 250. Jobs agent 220 may be communicatively coupled with an interface agent 225 (typically a software module or application). Interface agent 225 may include information processing and display software, such as a graphical user interface ("GUI"), an application program interface ("API"), or other interactive interface through which users and system processes can retrieve information about the status of storage operations. Through interface 225, users may optionally issue instructions to various storage systems 250 regarding performance of storage and recovery operations that may be implemented by the storage systems 250. For example, a user may modify a schedule concerning the number of pending snapshot copies or other types of copies scheduled as needed to suit particular needs or requirements. As another example, a user may employ the GUI to view the status of pending storage operations in some or all of the storage cells in a given network, or to monitor the status of certain components in a particular storage cell (e.g., the amount of storage capacity left in a particular storage device).

Storage manager 201 may also include a management agent 230 that is typically implemented as a software module or application program. In general, management agent 230 provides an interface that allows various management components 201 in other storage operation cells 250 to communicate with one another. For example, assume a certain network configuration includes multiple cells 250 adjacent to one another or otherwise logically related in a WAN or LAN configuration (not shown). With this arrangement, each cell 250 may be connected to the other through each respective interface agent 225. This allows each cell 250 to send and receive certain pertinent information from other cells 250 including status information, routing information, information regarding capacity and utilization, or the like. These communication paths may also be used to convey information and instructions regarding storage operations.

For example, a management agent in a first storage cell may communicate with a management agent in a second storage cell regarding the status of storage operations in the second storage cell. Another illustrative example includes the case where a management agent in first storage cell communicates with a management agent 230 in a second storage cell to control the storage manager 201 (and other components) of the second storage cell via the management agent 230 contained in the storage manager 201.

Another illustrative example is the case where management agent 230 in the first storage cell 250 communicates directly with and controls the components in the second storage cell 250 and bypasses the storage manager 201 in the second storage cell. If desired, storage cells 250 can also be organized hierarchically such that hierarchically superior cells control or pass information to hierarchically subordinate cells or vice versa.

Storage manager 201 may also maintain an index, a database, or other data structure 211. The data stored in database 211 may be used to indicate logical associations between components of the system, user preferences, management tasks, media containerization and data storage information or other useful data, as described in greater detail in application Ser. No. 10/818,749, now U.S. Pat. No. 7,246,207, herein incorporated by reference in its entirety. For example, the storage manager 201 may use data from database 211 to track logical associations between media agent 205 and storage devices 215 (or movement of data as containerized from primary to secondary storage). In addition, to the index 211, the storage system 250 can also include one or more indexes as part of the media agent 205.

Generally speaking, a media agent, which may also be referred to as or be implemented on a secondary storage computing device 207, may be implemented as a software module that conveys data, as directed by storage manager 201, between a client computer 285 and one or more storage devices 215 such as a tape library, a magnetic media storage device, an optical media storage device, solid state media, or any other suitable storage device. In one embodiment, secondary computing device 207 may be communicatively coupled with and control a storage device 215. A secondary computing device 207 may be considered to be associated with a particular storage device 215 if that secondary computing device 207 is capable of routing and storing data to particular storage device 215.

In operation, a secondary computing device 207 associated with a particular storage device 215 may instruct the storage device to use a robotic arm or other retrieval means to load or eject a certain storage media, and to subsequently archive, migrate, or restore data to or from that media. Secondary computing device 207 may communicate with a storage device 215 via a suitable communications path such as a SCSI or fiber channel communications link. In some embodiments, the storage device 215 may be communicatively coupled to a data agent 295 via a storage area network ("SAN"). As shown, in certain embodiments, each client 285 can communicate with any of the secondary storage computing devices 207, e.g., as directed by the storage manager 201, Moreover, each secondary storage device 207 can communicate with any of the secondary storage devices 215, e.g., as directed by the storage manager. Thus, storage operations can be routed to the storage devices 215 in a dynamic and flexible manner. This inter-networked configuration provides both scalability and efficient component utilization. Further compatible examples of dynamic storage operations are provided in application Ser. No. 10/818,749, now U.S. Pat. No. 7,246,207.

Each secondary storage computing device 207 may maintain an index 226, a database, or other data structure 226 which may store index data generated during backup, migration, and restore and other storage operations as described herein. For example, performing storage operations on Microsoft Exchange data may generate index data. Such index data provides a secondary computing device 205 or other external device with a fast and efficient mechanism for locating data stored or backed up. Thus, in some embodiments, a secondary storage computing device index 226, or a storage manager database 211, may store data associating a client 285 with a particular secondary computing device 207 or storage device 215, for example, as specified in a storage policy, while a database or other data structure in secondary computing device 207 may indicate where specifically the client 285 data is stored in storage device 215, what specific files were stored, and other information associated with storage of client 285 data. In some embodiments, such index data may be stored along with the data backed up in a storage device 215, with an additional copy of the index data written to index cache in a secondary storage device. Thus, the data is readily available for use in storage operations and other activities without having to be first retrieved from the storage device 215.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some embodiments, the cached information may include information regarding format or containerization of archive or other files stored on storage device 215.

In some embodiments, certain components may reside and execute on the same computer. For example, in some embodiments, a client computer 285, such as a data agent 295 or a storage manager 201, coordinates and directs local archiving, migration, and retrieval application functions as further described in U.S. patent application Ser. No. 09/610, 738. This client computer 285 can function independently or together with other similar client computers 285.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 285 can include a deduplicated database. The data stored in the storage devices 215 or storage devices 290 may also be deduplicated. For example, one or more of the media agents 205 associated with the respective storage devices 215 can manage the deduplication of data in the storage devices 215.

In some embodiments, the storage manager 201 may also include a client groups database 270, a configuration rules database 271, a client grouping module 272, and a configuration manager 274. The client grouping module 272 can group or associate one or more client computing devices (e.g., clients 285, etc.) together as part of a smart client group, or client group. The client grouping module 272 can group the one or more clients based on a set of one or more criteria that may or may not be associated with the clients. For instance, in some cases, a client may satisfy criteria associated with a client group by having a particular characteristic or attribute. In other cases, a client may satisfy the criteria by not having a particular characteristic or attribute. While the present disclosure is described primarily with respect to client computing devices, the grouping concepts described herein may apply to other components or devices, such as storage devices, virtual machines, workspaces, network devices, workstations, servers, etc.

In some cases, each storage system 250 can be one cell in a set of storage system cells. In such cases where there are multiple storage cells 250, the client grouping module 272 creates client groups based on clients included in a particular storage cell 250, such as the clients 285. Thus, each storage cell 250 may have separate client groups for the clients within the particular cell. Alternatively, in some cases, the client grouping module 272 can create client groups that include clients spanning multiple storage cells 250.

The configuration manager 274 can configure client devices based on a set of rules associated with a client group. For example, a client group that includes computing devices from a sales department may be associated with a rule that computing devices associated with the client group have sales and inventory tracking software installed. As a second example, a client group that includes computing devices for a software development team may be associated with a rule that computing devices associated with the client group be backed up every night. In contrast, the sales client group may be associated with a rule that associated computing devices be backed up on a weekly basis. Although the configuration manager 274 and the client grouping module 272 are described distinctly, in some embodiments, the configuration manager 274 and the client grouping module 272 can be a single system. Alternatively, the configuration manager 274 and the client grouping module 272, or portions thereof, may reside on separate computing systems.

The client group definitions may be stored at the client groups database 270 and the rules associated with configuring the clients associated with a client group may be stored at the configuration rules database 271. In some cases the client groups database 270 and the configuration rules database 271 may be included as part of a single data repository or database system and, e.g., stored on a single storage device. In other cases, each of the databases 270, 271 may be stored in separate repositories, database systems and/or storage devices. Further, storing the client group definitions can include storing the criteria associated with a client group and the identity of clients that are included in the client group (e.g., clients that satisfy the criteria associated with the client group).

Examples of Client Grouping Criteria

As previously mentioned, the client grouping module 272 can create or define a client group based on one or more client grouping criteria. The client grouping criteria can include any type of attribute or characteristic associated with a client computing device (or other grouped component). Generally, but not necessarily, the client grouping criteria can include any attribute that can be shared in common between at least two client devices. Some non-limiting examples of attributes that can be used as criteria for creating a new client group can include client name, operating system name, hardware configuration, application or software configuration, agent configuration, client group membership, clients with pinned jobs, clients with repeatedly scheduled jobs, and time zone.

To provide a better understanding of the client grouping criteria, and not to limit the number or type of possible client grouping criteria that may be used with the present disclosure, each of the aforementioned examples of client grouping criteria will now be described in more detail. The client name can be used to identify one or more clients with a particular name or the same name. Generally, network configurations require that client devices have a unique name among devices in a network or among devices in a sub-network of a network. In such cases, the client name can be used to identify one or more clients that share at least part of a name in common. For example, client devices associated with a sales and marketing group of an organization may each include the term "sales" as the first part of the device's names (e.g., "sales_1", "sales_2", "sales_3", etc.). In such cases, one criterion for creating the new client group can be that the client name includes the term "sales."

Similar to the client name, the operating system name can be used to identify one or more clients with a particular operating system. In some embodiments, the operating system name criterion can be used to identify clients using one or more operating systems from a set of operating systems. For example, the operating name criterion can be used to identify clients that use any Microsoft® operating system or any Linux or Unix-based operating system.

Client grouping criteria can be based on the hardware category of the clients. For example, one client grouping criteria can be laptops, which would identify all computing systems that are laptops. Similarly, the client grouping criteria could be used to identify smartphones, tablets, servers, desktops, etc. Alternatively, or in addition, the client grouping criteria can be based on the specific hardware configuration of the client devices. For example, a client group may be based on clients that have at least 4 Gigabytes (GB) of Random Access Memory (RAM). As a second example, a client group may be based on clients that have both a dual or quad core processor and a solid state hard drive.

Another client grouping criterion that may be used to define a new client group is the software or application configuration of a client. The software configuration of a client can include any number of software configuration factors including, for example: the type of software installed on a client; the identity of specific software installed on a client; the version of software installed on a client; the configuration of the software installed on a client; or a combination of two or more of the aforementioned software configuration factors. For example, a client group may be based on clients that include a particular email client (e.g., Outlook®, Eudora®, Thunderbird®, etc.). As another example, a client group may be based on clients that include particular database software or the latest version of the particular database software.

Agent configuration can also be used to define a new client group. The criterion of agent configuration can include the type of agents (e.g., data agents 295) that are installed on a client and, in some cases, the particular configuration of the installed agents. Different data management agents or data agents 295 may be configured to backup, migrate, and recover data associated with a different application. For example, different individual data agents 295 may be designed to handle Microsoft Exchange data, Lotus Notes data, Microsoft Windows file system data, Microsoft Active Directory Objects data, and other types of data. Other embodiments may employ one or more generic data agents 295 that can handle and process multiple data types rather than using the specialized data agents described above. One example definition of a new client group could be based on clients that include an agent designed to handle Microsoft Exchange data and an agent designed to handle Microsoft Active Directory Objects data.

In some cases, a client group can be a member of another client group. For example, client groups may be nested or arranged in a hierarchy with parent and child client groups, or inner nodes and leaf nodes. A more detailed example of a client group hierarchy is described below with respect to FIG. 4. In cases where a client group may be a member of another client group, a new client group can be based on one or more other client groups. Further, a client can be identified based on the one or more client groups of which the client is a member. For example, a client group that is created to include clients that use a Microsoft® operating system may include client grouping criteria defining that clients added to the group also be a member of one or more of the following groups: a Windows XP® client group, a Windows 7 client group, a Windows Server 2008 client group, and a Windows Phone 7 client group.

Pinned jobs can also be used to define a client group. A pinned job generally refers to an operation whose result is retained for at least a specific period of time (e.g., for long-term retention) regardless of a global policy or a multi-client policy that includes the client performing the operation and/or the client that is the subject of the operation. For example, an organization may have a retention policy that includes deleting backups of storage drives every 3-months. However, a particular client may have a pinned job that includes performing a backup operation and retaining the backup of the client for one year. In some cases, the specific period of time may be indefinite or until the job is unpinned by a user (e.g., an administrator). A client group may be defined that includes all clients that include a pinned job of a particular type or of any type.

Clients with associated with an operation that is scheduled to be performed on a repeated basis for a specific period, an indefinite period of time, or until cancelled can also be used as a criterion for creating a client group. Although the operation may be scheduled to be performed repeatedly, the operation may or may not be performed on a continuous basis. For example, the operation may be scheduled to be performed on a nightly, weekly, monthly, or yearly basis. Some non-limiting examples of operations or processes that may be scheduled as repeated jobs include deduplication, backup, system health checks, and system updates.

Another criterion that can be used to define a client group is geographic region, such as the North-East of America. Further, a client group can be based on the clients that are located in one or more time zones. For example, one client group can be based on clients located in the Eastern Standard Time zone and another client group can be based on the Pacific Standard Time zone. As another example, a client group can be based on clients located in all time zones that are included within Europe.

In some cases, the client grouping criteria may be defined to include clients that do not include particular criteria. For example, a client group may be defined to include clients that do not satisfy a particular hardware configuration, do not include particular software, are not in a particular geographic region (e.g., are not located within a particular time zone), or do not include a particular term as part of the client name.

Additional non-limiting examples of criteria that may be used as client grouping criteria can include: an associated user or set of users, an associated department of an entity or organization, a usage pattern of clients, a purchase date of clients, clients with one or more specific agents installed (e.g., exchange agents), storage policy, clients with encryption enabled, clients with a particular priority of configuration settings (e.g., high-priority settings, or administrator settings), and a date a client was included with or added to the storage system 250.

Example of a Client Group Creation Process

Figure 3:
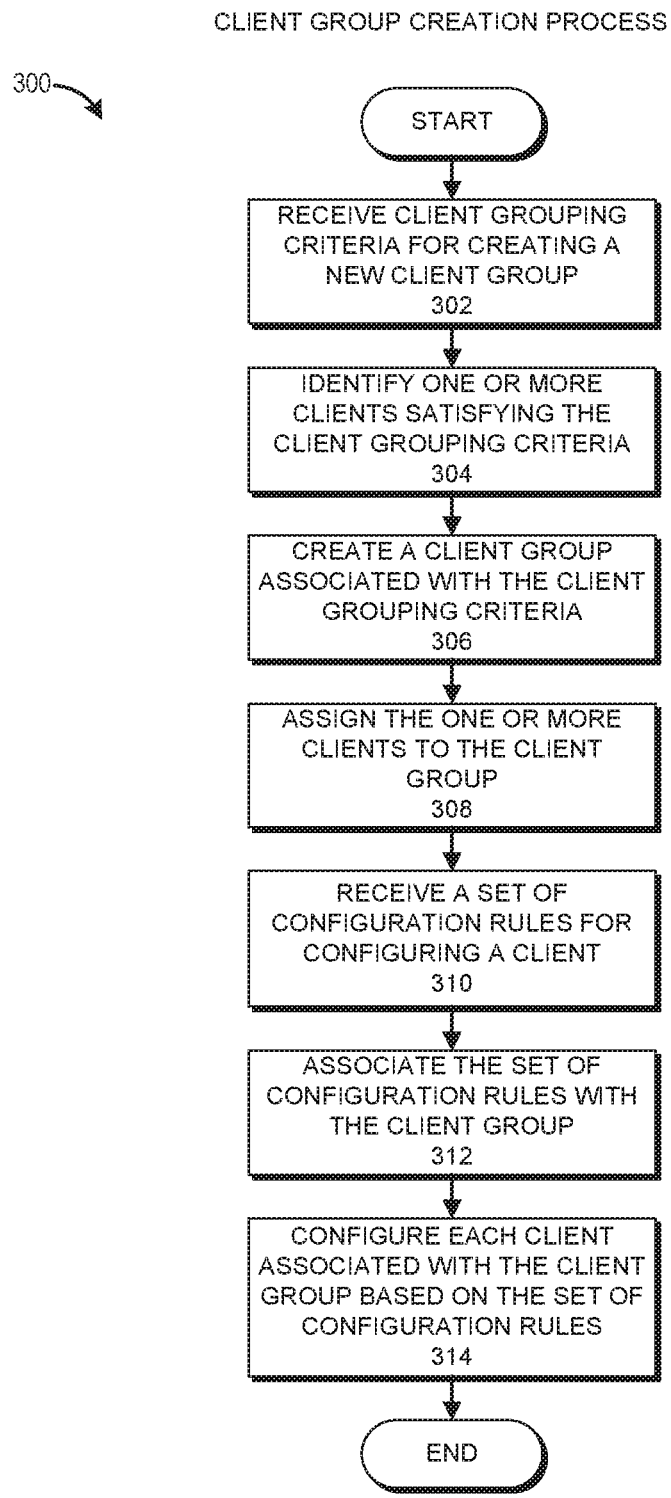
FIG. 3 presents a flowchart of an example of a client group creation process in accordance with the present disclosure.

FIG. 3 presents a flowchart of an example of a client group creation process 300 in accordance with the present disclosure. The process 300 can be implemented, at least in part, by any system that can create or define a client group based on a set of criteria related to the configuration and setup of client devices. Further, the process 300 can be implemented, at least in part, by any system that can assign or associate one or more client devices that satisfy a client group's set of criteria with the client group. For example, the process 300, in whole or in part, can be implemented by the storage manager 201, the media agent 205, the client grouping module 272, and the configuration manager 274, to name a few. Although any number of systems, in whole or in part, can implement the process 300, to simplify discussion, portions of the process 300 will be described with reference to particular systems.

The process 300 begins at block 302 where, for example, the client grouping module 272 receives one or more client grouping criteria for creating a new client group. In some embodiments, the client grouping criteria may be stored at a database (e.g., the database 270 or 271), and the client grouping module 272 accesses the database to obtain the client grouping criteria. The client grouping criteria may be specified by a user or by an application. In some cases, only an authorized user (e.g., an administrator) may specify the client grouping criteria. Further, in some cases, the client grouping criteria may be provided via a user interface, such as may be provided by the interface agent 225. Alternatively, or in addition, the client grouping criteria may be received from an application hosted by the storage manger 201 or by another computing system. The client grouping criteria can include any criterion for grouping clients including the non-limiting examples described above in the section titled "Examples of Client Grouping Criteria." In certain embodiments, the client grouping module 272 may be configured to use one or more default sets of client grouping criteria to group clients. In such embodiments, the default sets of client grouping criteria may, optionally, be overwritten by an administrator, or other authorized user or system.

At block 304, the client grouping module 272 identifies one or more clients (or other devices, systems, or grouped components) satisfying the client grouping criteria. The client grouping module 272 may identify a client satisfying the client grouping criteria by accessing one or more data sources that include or store attributes associated with the client. For example, the client grouping module 272 may access a database or data structure that includes at least some of the attributes of the client. This database or data structure may be stored in any type of data store accessible by the client grouping module 272, such as the database or index 211, the client groups database 270, the configuration rules database 271, or a client information database (not shown). Alternatively, or in addition, the client grouping module 272 may access a client to determine if the client satisfies the client grouping criteria. The one or more clients can include any type of computing system as previously described above. For example, the clients can include laptops, desktops, servers, mobile phones (e.g., smartphones), tablets, etc. In some embodiments, a client may satisfy the client grouping criteria if the client satisfies a subset of the client grouping criteria. For example, if the client grouping criteria includes five criteria, the client grouping module 272 may determine that a client satisfies the client grouping criteria if the client satisfies at least four of the five criteria.

The client grouping module 272 creates a client group associated with the client grouping criteria at block 306. Creating a client group can include creating an entry in a database or data structure and/or creating a new data structure associated with the client group. This entry or data structure can include a number of attributes and metadata associated with the client group. For example, the attributes and/or metadata can include the client group name, the client grouping criteria associated with the client group, a set of configuration rules as will be described further below, the identity of clients that satisfy the client grouping criteria, and any other information that can be used to define a client group. The client group (e.g., the entry or the data structure associated with the client group) can be stored at any type of data store accessible by the client grouping module 272, such as the database or index 211, the client groups database 270, the configuration rules database 271, or a client information database (not shown).

At block 308, the client grouping module 272 assigns the one or more clients (or other devices, systems, or grouped components) identified at the block 304 to the client group created at the block 306. Assigning a client to the client group can include storing the name of the client and/or a reference to the client in a data structure or an entry in a database associated with the client group. In some cases, assigning a client to the client group can include providing access to the client to an agent or application that enforces and/or executes policies and/or configuration rules associated with the client group.

At block 310, the configuration manager 274, for example, receives a set of configuration rules for configuring a client. In some cases, the configuration rules are received as part of the client group creation process (e.g., the process associated with the block 306). Alternatively, or in addition, the configuration rules may be received along with an identity of or a reference to the client group that is to be associated with the configuration rules. Further, in some cases, the configuration manager 274 may obtain the set of configuration rule by accessing the rules from the configuration rules database 271. The configuration rules can include any type of rule for configuring a client. For example, the configuration rules can include: specifying software for installation on a client; specifying configurations for software installed on a client; specifying software to remove from a client and/or to block from installation on a client; specifying the allocation of resources on a client (e.g., the amount or percentage of hard drive space reserved for a particular purpose); the frequency an operation is performed in relation to a client (e.g., how often data stored on the client is backed up, how often a cleanup utility is executed on a client, how often a deduplication process is executed on a client, etc.); the external resources the client can access (e.g., the backup server associated with the client; software licensing server associated with the client, etc.), etc. In some cases, the configuration rules can include preventing a particular configuration of a client. For example, the configuration rules could prevent the installation of particular software, the deletion of particular data or software, or accessing particular systems.

The configuration manager 274 associates the set of configuration rules with the client group at block 312. Associating the set of configuration rules with the client group can include storing the set of configuration rules with the client group definition. Further, associating the set of configuration rules with the client group can include storing the set of configuration rules at a database or data store associated with the client group. For example, the set of configuration rules may be stored at the configuration rules database 271 and/or the client groups database 270. In some embodiments, the client group, or client group definition, can include a pointer or link to the configuration rules, which may be stored in the same data store or a different data store from the client group. In some embodiments, a default set of configuration rules may be associated with a client group automatically, or by default. In such cases, blocks 310 and 312 may be optional. However, in certain embodiments, the configuration rules can be modified or overwritten by an administrator or other authorized user or system.

At block 314, the configuration manager 274 configures each client associated with the client group based on the set of configuration rules. Configuring the clients can include performing the configuration rules or causing processes to be initiated that result in the configuration rules being satisfied. For instance, in one embodiment, the configuration manager 274 resides on the storage manager 201 as shown and provides configuration instructions to each target client 285, which performs the configuration. In some embodiments, one or more of the blocks 310, 312, and 314 may be optional. For example, in some cases, a client group may be used to identify clients, or to facilitate accessing clients, but not necessarily to configure clients. Advantageously, in some embodiments, using a client group to identify or access clients is faster than manually identifying or accessing a set of clients. In some embodiments, some or all of the configuration rules may be implemented by other systems. For example, some configuration rules may be implemented by the storage manager 201, by one or more data management agents or other components installed on the client, by a media agent, by the client itself, etc.

Although the process 300 has generally been described with respect to client devices, in some embodiments, the process 300, as well as the additional processes described herein, may be performed with respect to sub-components of a client device (or other appropriate component in the data storage system 250). As a few examples, the processes may be performed with respect to a particular software application, workspace and/or account (e.g., a user account) on a client or a number of clients. For instance, in some cases, the block 304 may include identifying one or more software applications, workspaces and/or accounts that satisfy a set of grouping criteria. Further, the block 314 may include configuring a workspace and/or account based on the set of configuration rules. Thus, in some cases, a client that includes multiple workspaces and/or accounts may include multiple configurations, one for each workspace and/or account client.

In some embodiments, the process 300 may be repeated multiple times for different sets of client grouping criteria. Clients that satisfy the client grouping criteria of multiple client groups may be assigned to multiple client groups. Alternatively, a client may be assigned to the client group that includes the most client grouping criteria that the client satisfies. In some cases, parent client groups can include other client groups or child client groups. In such cases, the clients associated with the child client groups may also be associated with the parent client group, but clients associated with the parent client groups may or may not be associated with the child client groups. One non-limiting example of client group relationships, hierarchical client groups, is described in further detail below with respect to FIG. 4.

In some embodiments, a client may belong to two different client groups that may have conflicting configuration rules. In such cases, the client groups may be associated with different rankings or priority levels. The configuration manager 274 can determine which configuration rules to follow based on the priority levels of the client groups. Further, in cases where only some configuration rules conflict, the non-conflicting configuration rules may be implemented regardless of which client group the configuration rule includes the configuration rule. In some cases, a user may be informed of a conflict in configuration rules between the clients groups of a particular client, and the use can determine which configuration rules to follow or whether to take an alternative action, such as redefining the client groups.

Example of a Client Addition Process

Figure 4:
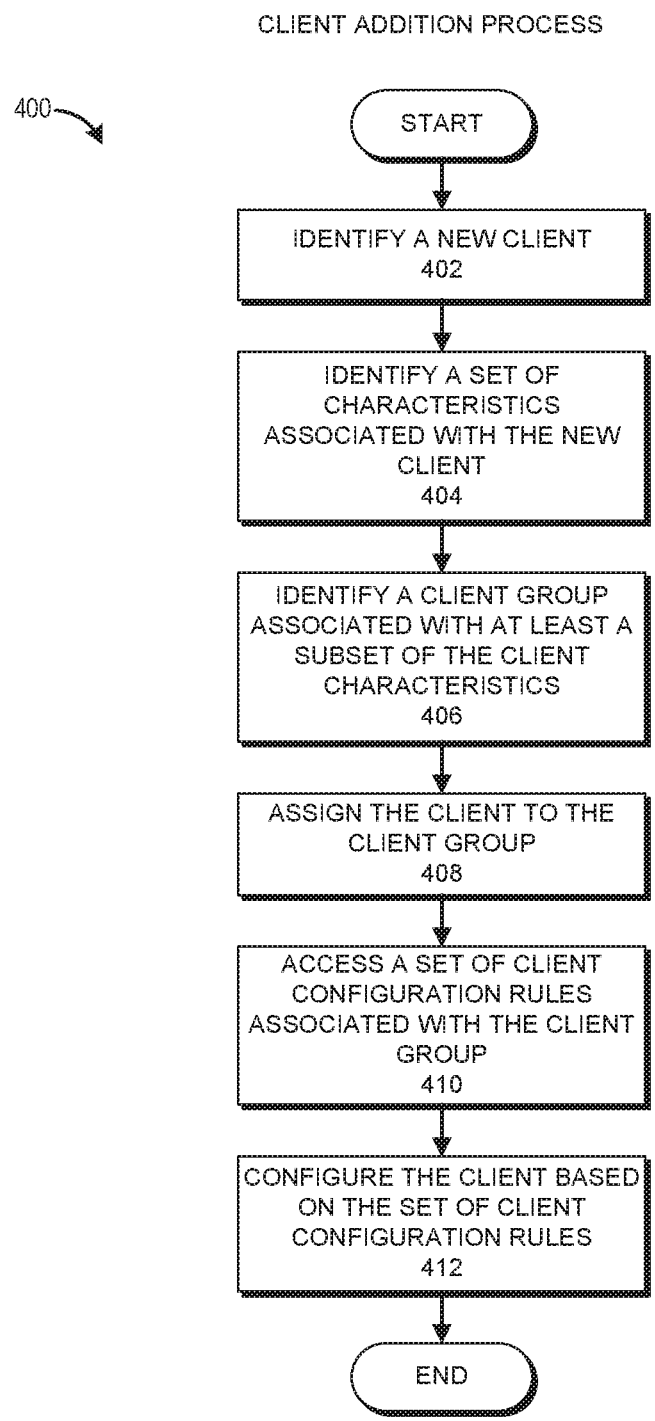
FIG. 4 presents a flowchart of an example of a client addition process in accordance with the present disclosure.

FIG. 4 presents a flowchart of an example of a client addition process 400 in accordance with the present disclosure. The process 400 can be implemented, at least in part, by any system that can add a client to a client group that has been created using a client group creation process, such as the process 300. For example, the process 400, in whole or in part, can be implemented by the storage manager 201, the media agent 205, the client grouping module 272, and the configuration manager 274, to name a few. Although any number of systems, in whole or in part, can implement the process 400, to simplify discussion, portions of the process 400 will be described with reference to particular systems.

The process 400 begins at block 402 where, for example, the client grouping module 272 identifies a new client (or other device, system, or grouped component). The new client may be a client that is newly added to a set of clients associated with an organization or an existing client that is newly accessible by the client grouping module 272. In some embodiments, the client identified at the block 402 may be an existing client whose configuration and/or attributes have changed thereby potentially changing the client group(s) with which the client may be associated. While in some cases modifying a client will change one or more of the client's associated client groups, in other cases, modifying a client will not change the client's associated client groups. To simplify discussion, the rest of the process 400 will be described with respect to a new client. However, it should be understood that the process 400 can be performed with respect to a modified client.

At block 404, the client grouping module 272 identifies a set of characteristics or attributes associated with the new client. Identifying the set of attributes associated with the new client can include accessing a database that includes metadata associated with the client. Alternatively, or in addition, identifying the set of attributes may include accessing the new client to determine the attributes. In some cases, a polling model can be used to determine a client's attributes. In such cases, the storage manager 250 or client grouping module 272 can poll clients periodically to detect configuration or attribute changes of the client. In other cases, a messaging module (not shown) may be used by a client to report changes in the client's configuration or attributes to the storage manager 250 or client grouping module 272. The client may report the changes when they occur or at some other specific time. Further, the attributes identified at the block 404 may include a complete set of attributes associated with the client or, in some cases, a subset of attributes. For example, a database may include ten pieces of metadata associated with the client, but, in some cases, the client grouping module 272 may access less than the ten pieces of metadata. The determination of which pieces of metadata to access may be based on the characteristics associated with existing client groups, administrative settings, and/or any other factor that may be used to determine the metadata to access. In some embodiments, the block 404 may include some or all of the embodiments described above with respect to the block 304 and determining the attributes of a client.

The client grouping module 272 identifies a client group associated with at least a subset of the characteristics or attributes associated with the new client at block 406. Identifying the client group can include accessing characteristics or client grouping criteria associated with one or more client groups from a database, such as the client groups database 270, that stores the client group definitions. Alternatively, or in addition, the client grouping module 272 may access a data structure associated with one or more client groups from a data store that includes data associated with the client groups.

At block 408, the client grouping module 272 assigns the new client to the client group identified at the block 406. In some cases, multiple client groups may be identified at the block 406 that are associated with the set of characteristics identified at the block 404. In such cases, the client grouping module 272 may assign the new client to each of the client groups. Alternatively, or in addition, the client grouping module 272 may cause a user to be prompted to select one or more of the client groups associated with the set of client characteristics. The client can then be assigned to the one or more client groups selected by the user. In some embodiments, a user may assign a client to a particular client group. In such cases, the blocks 404, 406, and 408 may be optional.

In some embodiments, at least some client groups may form a hierarchical structure with each client group representing a node in the hierarchy. The hierarchy may be based on the client characteristics that form the client grouping criteria. For example, a parent node may include characteristics A and B, and a child node that descends from the parent node may include characteristics A, B, and C. Clients having characteristics A and B may be assigned to the client group represented by the parent node. Clients having characteristics A, B, and C may be assigned to the client group represented by the child node. In some cases, the clients with characteristics A, B, and C may be assigned to the parent node and the child node client groups. Each parent node may have multiple child nodes. Further, in some cases, each child node may have one or more parent nodes. For example, continuing with the previous example, a second parent node may include characteristics D and E. A child node having characteristics A, B, D, E, and F may descend from the parent node of the previous example and the second parent node. Clients having characteristics A, B, D, E, and F may then be assigned to a client group represented by the child node having characteristics A, B, D, E, and F. Although the above examples describe a two-level hierarchy with a level of parent nodes and a level of child nodes, the hierarchy is not limited as such. The hierarchy can include any number of levels and a node may be both a parent node and a child node. Further, in some cases, a client group can include another client group. For example, the client group of the parent node can include the client groups of the child nodes.

In some cases, clients may be associated with each node, or client group, whose client grouping criteria the client satisfies. Thus, a client with characteristics A, B, and C may be associated with both the parent node, associated with characteristics A and B, and the child node, associated with characteristics A, B, and C, of the example described above. In other cases, clients may be associated with the node that includes the highest number of characteristics satisfied by the clients. Thus, a client with characteristics A, B, and C, may be associated with the child node, associated with characteristics A, B, and C, but not necessarily the parent node, associated with characteristics A and B, of the example described above.

It is possible in some cases that a client may not satisfy the client grouping criteria of any client groups. In such cases, the client may be assigned to a special client group or default client group for clients which do not satisfy any of the other client groups. In other cases, a new client group may be created based on the client's characteristics using, for example, the process 300. Alternatively, or in addition, a user may be notified that a client does not satisfy the client group criteria of any existing client group, and the user can then be given the option to create a new client group, modify an existing client group, assign the client to a default area, or modify the client to conform to one or more client groups.

At block 410, the configuration manager 274, for example, accesses a set of client configuration rules associated with the client group. The client configuration rules may be accessed from a data store, data structure, or database entry associated with the client group. For example, the client configuration rules may be accessed from the configuration rules database 271, the client groups database 270, or any other data store. In embodiments where the client is assigned to multiple client groups, the configuration manager 274 may access a set of client configuration rules associated with each client group.

At block 412, the configuration manager 274 configures the client based on the set of client configuration rules. In embodiments where the client is assigned to multiple client groups, the configuration manager 274 may configure the client based on the client configuration rules associated with each client group. Alternatively, the configuration manager 274 may configure the client based on the client configuration rules associated with a client group that is identified as higher priority. In other cases, the configuration rules used may be based on identifying the client group whose name is alphabetically first or last compared to the client's other client groups. As another alternative, the configuration rules of the client group that was created most recently or least recently may be used. In other cases, the configuration rules associated with the client group that is the highest or that is the lowest in a hierarchy may be used to configure the client. As yet another alternative, the configuration manager 274 may configure the client based on non-conflicting client configuration rules associated with each client group. Conflicting configuration rules may be ignored or a process may be used to select the conflicting configuration rule to use. This process of selecting the conflicting configuration rule to follow can include selecting the configuration rule of the client group with the highest priority, that was created first or last, or any other process for selecting a client group. In certain embodiments, the block 412 may include some or all of the embodiments associated with the block 314. Further, in some cases, the blocks 410 and 412 may be optional.

Example of a Client Group Configuration Update Process

Figure 5:
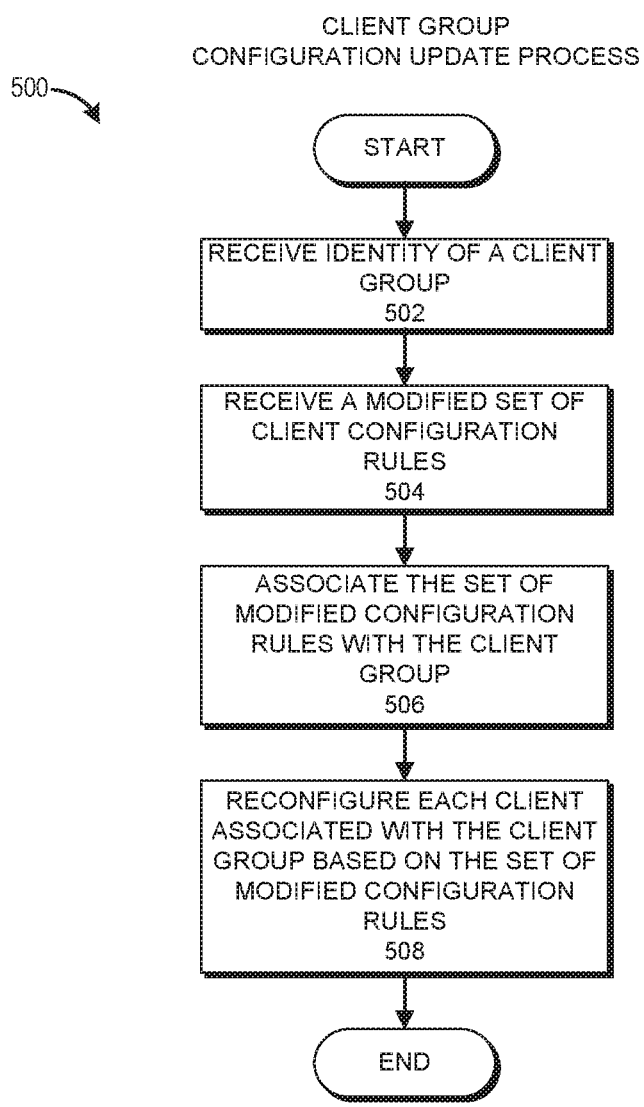
FIG. 5 presents a flowchart of an example of a client group configuration update process in accordance with the present disclosure.

FIG. 5 presents a flowchart of an example of a client group configuration update process 500 in accordance with the present disclosure. The process 500 can be implemented, at least in part, by any system that can update the client configuration rules associated with a client group and that can configure one or more clients from the client group based on the updated client configuration rules. For example, the process 500, in whole or in part, can be implemented by the storage manager 201, the media agent 205, the client grouping module 272, and the configuration manager 274, to name a few. Although any number of systems, in whole or in part, can implement the process 500, to simplify discussion, portions of the process 500 will be described with reference to particular systems.

In certain embodiments, the process 500 may occur when a user manually modifies a set of configuration rules associated with a client group using, for example a GUI or other interface presented by the storage manager 201. In other embodiments, the process 500 may occur when an automated system modifies a client group's configuration rules based on a trigger. This trigger may include any type of change to hardware or software of the storage system 250. For example, the trigger may be based on the availability of new software or a newer version of existing software.

The process 500 begins at block 502 where, for example, the client grouping module 272 receives the identity of a client group. In some cases, the block 502 can include receiving a set of characteristics associated with a client group and identifying the client group based on the set of received characteristics.

At block 504, the client grouping module 272 receives a modified set of client configuration rules. The modified set of client configuration rules can include a new set of client configuration rules or a change to the set of client configuration rules associated with the client group identified at the block 502. Further, the modified set of client configuration rules can include the entire set of configuration rules or may be limited to the configuration rules that are being modified. In some cases, the modified set of configuration rules can include new rules. Alternatively, or in addition, the modified set of configuration rules can include the deletion of configuration rules that were previously associated with the client group identified at the block 502.

The client grouping module 272 associates the set of modified configuration rules with the client group at block 506. Associating the set of modified configuration rules with the client group can include storing the set of modified configuration rules in place of the configuration rules that were previously associated with the client group. In some cases, associating the set of modified configuration rules with the client group can include removing rules previously associated with the client group. In some embodiments, the block 506 may include some or all of the embodiments associated with the block 312.

At block 508, the configuration manager 274, for example, reconfigures each client associated with the client group based on the set of modified configuration rules. In some embodiments, the block 508 can include some or all of the embodiments associated with the block 314. In some cases, the block 508 may be optional. For example, some or all of the existing clients may already be configured according to the modified configuration rules. In such cases, configuration rules may be modified, for example, the purpose of future clients that may be added to the client group.

Example of a Client Disassociation/Reconfiguration Process

Figure 6:
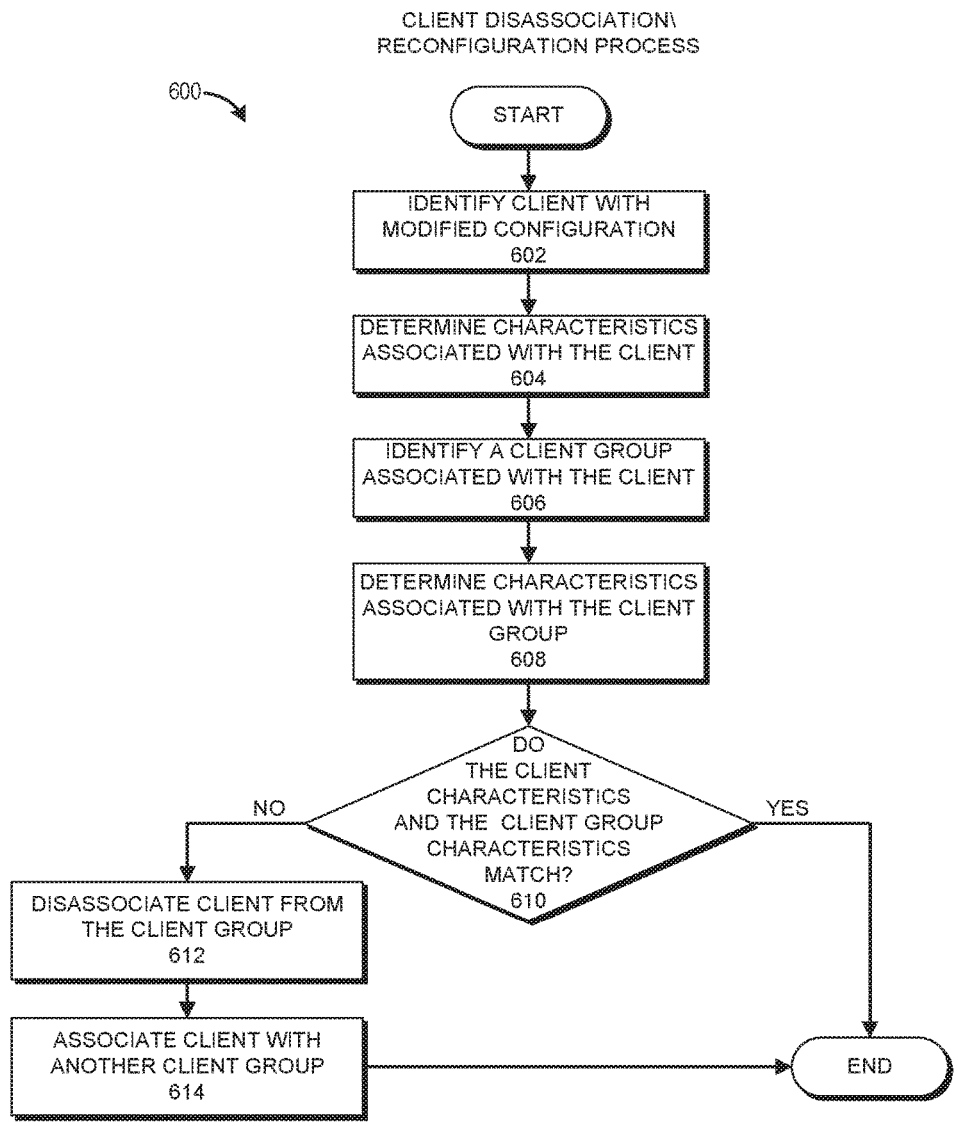
FIG. 6 presents a flowchart of an example of a client disassociation/reconfiguration process in accordance with the present disclosure.

FIG. 6 presents a flowchart of an example of a client disassociation/reconfiguration process 600 in accordance with the present disclosure. The process 600 can be implemented, at least in part, by any system that can disassociate a client from a client group. Further, the process 600 can be implemented, at least in part, by any system that can reconfigure a client. For example, the process 600, in whole or in part, can be implemented by the storage manager 201, the media agent 205, the client grouping module 272, and the configuration manager 274, to name a few. Although any number of systems, in whole or in part, can implement the process 600, to simplify discussion, portions of the process 600 will be described with reference to particular systems.

The process 600 begins at block 602 where, for example, the configuration manager 274 identifies or detects a client with a modified configuration. In some cases, a modified client may be registered with the configuration manager 274 as having been modified. Alternatively, or in addition, metadata associated with the modified client that is stored at a data store (e.g., the client groups database 270) may be updated to indicate the client has been modified. In some cases, a polling model can be used to determine whether a client's configuration has changed. In such cases, the storage manager 250 or the configuration manager 274 can poll clients periodically to detect configuration or attribute changes of the client. In other cases, a messaging module (not shown) may be used by a client to report changes in the client's configuration or attributes to the storage manager 250 or the configuration manager 274. The client may report the changes when they occur or at some other specific time. The configuration manager 274 may register the change to the metadata associated with the particular modified client(s), or the configuration manager 274 may access the data store at a scheduled time to identify clients that have been modified. For example, the configuration manager 274 may check the data store every hour, every night, or once a week to determine if a client has been modified. In some cases, the configuration manager 274 may access a client to determine if the client has been modified. In some embodiments, the configuration manager 274 identifies clients as having been modified in response to the modification of a particular set or subset of attributes. Thus, in some cases, a modification to an attribute of a client that is not from the particular set of attributes will not cause the client to be identified as a modified client.

At block 604 the client grouping module 272, for example, determines characteristics, or attributes, associated with the client identified at the block 602. Identifying the characteristics associated with the client may include accessing the client to determine the characteristics. Alternatively, or in addition, determining the client's attributes may include accessing a data store that includes metadata associated with the client. This metadata can include, inter alia, the client's attributes.

The client grouping module 272 identifies a client group associated with the client at block 606. Identifying the client group associated with the client can include accessing the client groups database 270. At block 608, the client grouping module 272 determines characteristics, or client grouping criteria, associated with the client group. Identifying the client grouping criteria can include accessing the client groups database 270.

At decision block 610, the client grouping module 272 determines whether the client characteristics of the client with the modified configuration and the client group characteristics match. Determining whether the client characteristics and the client group characteristics match can include determining whether the client characteristics satisfy the client grouping criteria. If the client characteristics still match the client grouping criteria, the process 600 ends.

If the client grouping module 272 determines that the client characteristics of the client with the modified configuration no longer match the client group characteristics, the client grouping module 272 disassociates the client from the client group at block 612. Disassociating the client from the client group can include causing a user (e.g., an administrator) to be informed that the client no longer satisfies the client grouping criteria of the group and that the client is being removed from the group. In some cases, the user may have the option to confirm or to undo the configuration change to maintain the client as part of the client group.

At block 614, the storage manager 250 can cause the client to be associated with another client group using a client grouping process or a process to add a client to a client group. For example, the block 614 can include initiating the process 400. In some embodiments, the block 614 may be optional.

In some embodiments, instead of disassociating the client from the client group at the block 612, the configuration manager 274 reconfigures the client to satisfy the client grouping criteria. Whether to disassociate the client from the client group or to reconfigure the client to match the client grouping criteria of the client group may be based on one or more characteristics of the client. For example, a client identified as belonging to the sales or marketing department may be disassociated from the client group to which it previously belonged. However, a client identified as belonging to the research and development compartment may be reconfigured and/or have modifications to the client reversed so as to maintain the client as a member of its current client group. In some cases, the decision of whether to disassociate the client or reconfigure the client may be based on system configuration settings of the storage manager 201.

In cases where the client is associated with multiple client groups, rather than the process 600 ending at decision block 610, block 612, or block 614, the process 600 may return to the block 606 and repeat the subsequent processes for each client group that includes the client.

Each of the previously described processes (e.g., processes 300, 400, 500, and 600) may be fully automated and user interaction may not be required or may be optional. In some cases, at least some of the processes may involve user interaction. For example, client grouping characteristics may be provided by a user. As a second example, a user may confirm whether to add or remove a client from a client group.

Example of a User Interface

Figure 7:
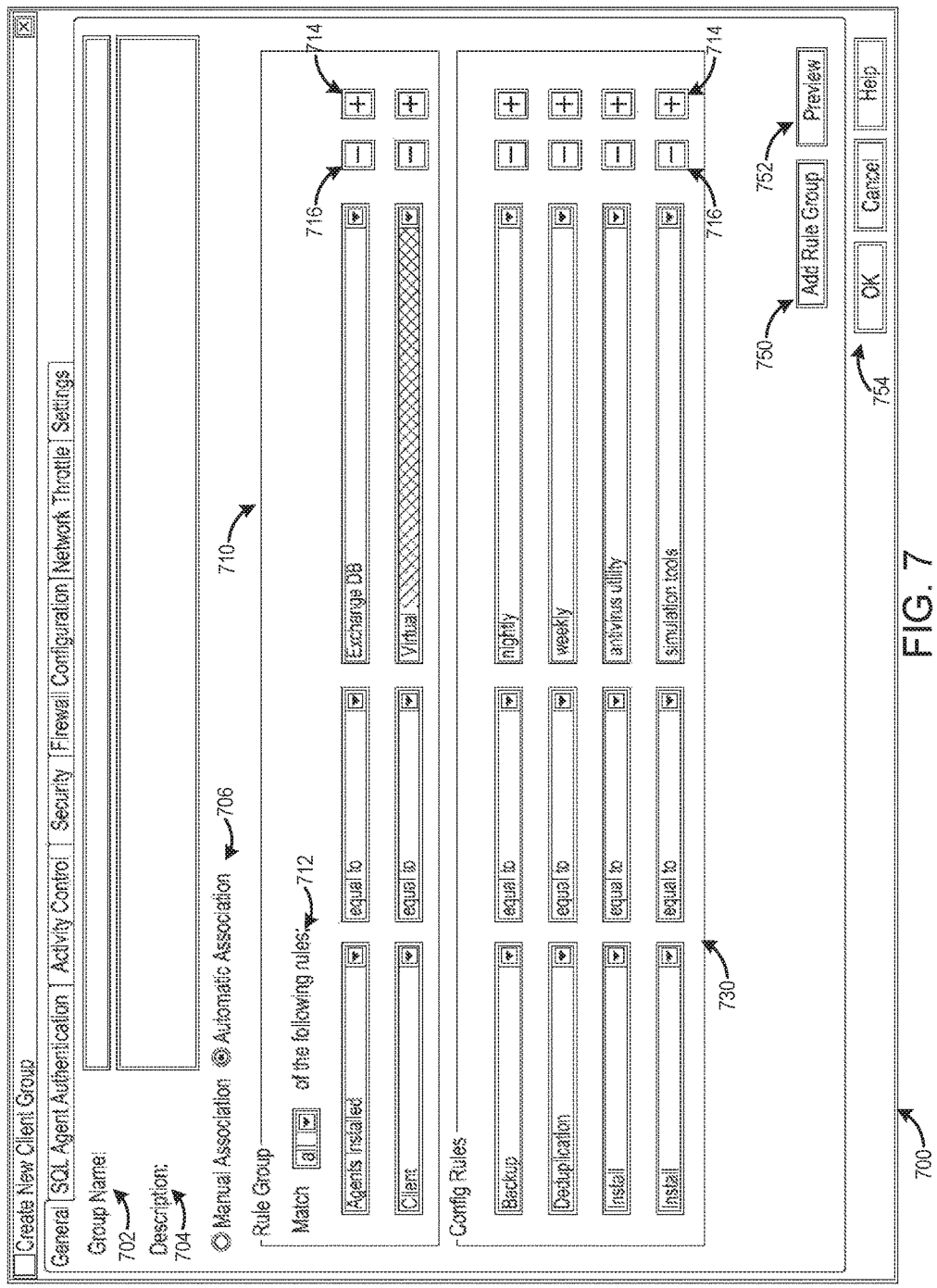
FIG. 7 presents an example of a user interface for creating a client group in accordance with the present disclosure.

FIG. 7 presents an example of a user interface 700 for creating a client group in accordance with the present disclosure. A user can use the user interface 700 to specify client grouping criteria that can be used to define a client group. Further, the user can specify configuration rules via the user interface 700 for configuring clients that satisfy the client grouping criteria of the client group. Although the user interface 700 is illustrated as a Graphical User Interface (GUI), the user interface 700 is not limited as such. For example, in some cases, the user interface 700 may be a Command Line Interface (CLI), a text-based interface, or a combination of interface types. Further, although the user interface 700 is illustrated in FIG. 7 as an application window, in some cases, the user interface 700 may be presented via a web browser.

The user interface 700 can be accessed using any computing system. For example, the user interface 700 can be accessed via a client 285. Further, in some cases, the user interface 700 can be accessed using the storage manager 201. For example, the interface agent 225 of the storage manager 201 may cause the user interface 700 to be generated and/or presented to a user via a display associated with the storage manager 201 or via a client 285 that can communicate with the storage manager 201.

The user interface 700 can include a number of interface elements to facilitate creating the client group. For example, the user interface 700 can include a name field 702, a description field 704, an association option selection interface 706, a rule group panel 710, a configuration rules panel 730, an add group button 750, and a preview button 752.

The name field 702 can be used to enter a name for the client group. Alternatively, the user interface 700, the storage manager 201, or a subsystem of the storage manager 201 (e.g., the client grouping module 272 or interface agent 225) can generate the name for the client group. The name may be generated based on any factor including, for example, the client grouping criteria entered in the rule group panel 710.

The description field 704 can be used to specify a description for the client group defined by the client grouping rules. As with the name field 702, a user can supply the contents of the description field 704 or the user interface 700, the storage manager 201, or a subsystem of the storage manager 201 can supply the contents of the description field 704.

A user can specify whether clients that satisfy the client grouping criteria are automatically associated with the client group defined via the user interface 700 by selecting the automatic association option from the association option selection interface 706. Alternatively, a user can cause, for example, the user interface 700 or the client grouping module 272, to present clients that satisfy the client grouping criteria to the user by selecting the manual association option from the association option selection interface 706. Presenting clients to a user can include presenting any type of information associated with the client to the user, such as the client's name, physical location, department, configuration, etc. The user can then decide on a per client basis whether to associate the client with the client group defined via the user interface 700. Advantageously, in certain embodiments, by presenting a client to the user that satisfies the client grouping criteria and by allowing the user to confirm whether to add the client to the client group, the user can verify that the client group includes clients that are to be associated with the client group. Further, the user can confirm the client group does not include clients that should not be associated with the client group. In addition, with the manual association option, the user has the ability to exclude or include a client regardless of whether the client satisfies the client grouping criteria.

Another option available, in some cases, to the user to verify the clients that will be added to the client group is the preview button 752. This button can be used to cause the user interface 700 to present the user with the identity of clients that will be associated with the client group if the user confirms creation of the client group by selecting the add rule group button 750 or the ok button 754. Alternatively, or in addition, the preview button 752 can be used to preview the effects of configuration rules specified in the configuration rules panel 730 on each client included in the client group or that will be included in the client group if creation of the client group is confirmed. Because there may be large numbers of clients, the preview function can greatly improve efficiency and reduce the risk of undesired groupings.

In order to define the client group, a user can specify the set of client grouping criteria using the rule group panel 610. Using the rule group panel 710, the user can specify any number and type of client group criteria that can be used to identify one or more clients. For example, as illustrated in FIG. 7, a user can create a client group including clients that have an Exchange Database agent installed and that are virtual clients. Further, as illustrated by the match option 712, in the example illustrated in FIG. 7, a client must satisfy all of the criteria specified in the rule group panel 710 to be included in the client group. Using the match option 712, a user can specify the number or percentage of rules that a client must satisfy to be included in a client group. For example, in some cases a client can be included in a defined client group if the client satisfies at least 75% of the specified rules or 4 of 5 specified rules. In some cases, certain rules may be weighted more heavily than other rules. In such cases, a client that satisfies a more heavily weighted rule may be included in the client group while a client that satisfies more rules, but, not the more heavily weighted rule, may not be included in the client group and vice versa.

A user can add additional client grouping criteria, or configuration rules, to a client group definition by selecting the plus button 714. Similarly, a client grouping criterion, or configuration rule, can be deleted from a client group definition by selecting the minus button 716 corresponding to the deleted criterion or rule.

Using the configuration rule panel 730, a user can specify configuration rules for configuring clients associated with the client group defined by the client grouping criteria of the rule group panel 710. The configuration rules can include any number or type of configuration rules. Further, in some cases, the configuration rules may be optional. Thus, as previously mentioned, a user can add or remove configuration rules by selecting the plus button 714 or the minus button 716 respectively. In the example illustrated in FIG. 7, the client group includes four configuration rules. Upon creation of the client group and/or confirmation of the configuration rules associated with the client group created via the user interface 700 each client associated with the client group will be configured using the four configuration rules specified in the configuration rule panel 730. Thus, each client association with the client group will be configured to be backed up on a nightly bases and have its data deduplicated on a weekly basis. Further, each client of the client group will have an antivirus utility installed and a set of simulation tools installed. The specific software to be installed may be specified in the configuration rules panel 730 or may be identified in a table, or other data structure, that associates specific software with the labels presented to the user in the user interface 700. Advantageously, in certain embodiments, by updating an entry in the data structure, a user can update the version of software or the specific software selected for installation on clients of a number of client groups without separately editing the definition of each client group or the configuration rules associated with each client group. For example, if a new version of the antivirus utility is released, the user can update the antivirus entry in the data structure, and all client groups that include a configuration rule specifying that an antivirus utility be installed can automatically update the antivirus utility on all clients included in the client groups.

For illustrative purposes, the configuration rules panel 730 is depicted in the same window as the rules group panel 730 in FIG. 7. However, in some embodiments, the rule group panel 710 and the configuration rule panel 730 may be in separate windows. Further, in some cases, the configuration rule panel 730 may be presented to the user after the user creates the client group by, for example, selecting the add rule group button 750.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of managing a set of client computing devices in a networked data storage environment, the method comprising:

electronically accessing, from a data store, grouping criteria for grouping a plurality of client computing devices that form a client pool into one or more client groups, the client groups comprising different priority levels, the client computing devices each having at least one software application executing thereon that generates production data, wherein primary copies of the production data are stored in primary storage in a native format, and wherein secondary copies of the production data are stored in secondary storage separate from the primary storage in a secondary storage format that is different than the native format, and wherein the grouping criteria comprise a plurality of grouping rules of different weights;

comparing during creation of the secondary copies, by one or more processors, a set of characteristics associated with a first client of the plurality of client computing devices to the grouping criteria to obtain a first comparison result of the percentage of grouping rules that the first client satisfies;

based on the first comparison result that the client satisfies at least one of the group comprising: a predetermined percentage of the grouping rules and at least a more heavily weighted rule, assigning the first client to first and second client groups of the one or more client groups;

when the first and second client groups have conflicting configuration rules, selecting a set of configuration rules to follow based on the priority levels of the client groups;

electronically accessing, from a data store, a set of configuration rules associated with the first and second client groups;

automatically initiating, by one or more processors, the configuration of the first client according to the set of configuration rules, wherein based on at least the client name of the first client, the set of configuration rules direct the one or more processors to automatically install on the first client the one or more software applications that generate the production data in the native format, automatically install one or more application-specific data agents to access the production data of an associated application in the native format, and automatically identify one or more storage policies when backups are to occur; and automatically copying, based on the one or more storage policies associated with the selected set of configuration rules, the production data generated by the first client stored in the native format to create one or more secondary copies of the production data in the secondary storage in the secondary storage format.

2. The method of claim 1, further comprising:
in response to a second client computing device being added to the pool, comparing, by one or more processors, a set of characteristics associated with the second client with the grouping criteria;
based on the comparison, assigning the second client to the first client group; and
initiating the configuration of the second client according to the set of configuration rules.

3. The method of claim 1, further comprising, in response to a modification in the set of configuration rules, initiating re-configuration of the first client according to the modified configuration rules.

4. The method of claim 1, further comprising:
in response to a change in the set of characteristics associated with the first client, comparing, by one or more processors, the changed set of characteristics associated with the first client to the grouping criteria; and
if the comparison of the changed set of characteristics to the grouping criteria indicates that the client should no longer be assigned to the first client group, disassociating the first client from the first client group.

5. The method of claim 1, further comprising presenting a graphical user interface (GUI) to a user enabling the user to define grouping criteria rules.

6. The method of claim 1, wherein the one or more client groups are organized in a hierarchy of parent client groups and child client groups, each parent client group having a subset of the grouping criteria included by a child client group of the parent client group.

7. The method of claim 1, further comprising:
receiving modified grouping criteria for grouping the plurality of client computing devices; and
comparing, by one or more processors, the set of characteristics associated with the first client of the plurality of client computing devices to the modified grouping criteria to obtain a second comparison result.

8. The method of claim 7, further comprising assigning the first client to a client group of the one or more client groups based on the second comparison result.

9. The method of claim 7, further comprising:
presenting a preview of the one or more client groups based on the second comparison result, the preview indicating the clients to be included by each client group of the one or more clients groups upon receiving confirmation of the modified grouping criteria; and
in response to receiving the confirmation of the modified grouping criteria, assigning the first client to the client group of the one or more client groups based on the second comparison result, wherein the preview indicates that the client group includes the first client.

10. The method of claim 1, wherein the set of characteristics can include one or more of the following: an installed software application, a hardware component, a geographic location, a name, a usage pattern, an associated user, a date, an installed agent, and a device classification of a client computing device.

11. The method of claim 1, wherein the configuration rules can include one or more of the following: installation of a software application, installation of an agent, scheduling of a backup operation, and scheduling of a deduplication operation.

12. A system for managing a set of client computing devices in a networked data storage environment, the system comprising:
data storage configured to store grouping criteria for grouping a plurality of client computing devices that form a client pool into one or more client groups, the client groups comprising different priority levels, the client computing devices each having at least one software application executing thereon that generates production data, wherein primary copies of the production data are stored in primary storage in a native format, and wherein secondary copies of the production data are stored in secondary storage separate from the primary storage in a secondary storage format that is different than the native format, and wherein the grouping criteria comprise a plurality of grouping rules of different weights;
the data storage further configured to store configuration rules for configuring client computing devices;
computer hardware comprising one or more processors;
a client grouping module executing in the one or more processors and configured to:
electronically access the grouping criteria from the data storage during the creation of the secondary copies;
compare a set of characteristics associated with a first client of the plurality of client computing devices to the grouping criteria to obtain a first comparison result of the percentage of grouping rules that the first client satisfies; and
based on the first comparison result that the client satisfies at least one of the group comprising: a predetermined percentage of the grouping rules and at least a more heavily weighted rule, assign the first client to first and second client groups of the plurality of client groups;
when the first and second client groups have conflicting configuration rules, select a set of configuration rules to follow based on the priority levels of the client groups;
a configuration manager executing in the one or more processors and configured to:

electronically access, from the data storage, a set of configuration rules associated with the first and second client groups; and initiate the configuration of the first client according to the set of configuration rules, wherein based on at least the client name of the first client, the set of configuration rules direct the one or more processors to automatically install on the first client the one or more software applications that generate the production data in the native format, automatically install one or more application-specific data agents to access the production data of an associated application in the native format, and automatically identify one or more storage policies when backups are to occur; and a storage manager executing in the one or more processors and configured to:

automatically copy, based on the one or more storage policies associated with the selected set of configuration rules, the production data generated by the first client stored in the native format to create one or more secondary copies of the production data in the secondary storage in the secondary storage format.

13. The system of claim 12, wherein the client grouping module is further configured to:

compare a changed set of characteristics associated with the first client to the grouping criteria in response to the change in the set of characteristics associated with the first client; and if the comparison of the changed set of characteristics to the grouping criteria indicates that the client should no longer be assigned to the first client group, disassociate the first client from the first client group.

14. The system of claim 13, wherein:

the client grouping module is further configured to assign the client to a second client group; and the configuration module is further configured to:

electronically access from the data storage a set of configuration rules associated with the second client group; and initiate the re-configuration of the first client according to the set of configuration rules associated with the second client group.

15. The system of claim 12, further comprising an interface module configured to present a graphical user interface (GUI) to a user enabling the user to define grouping criteria rules.

16. The system of claim 12, wherein the one or more client groups are organized in a hierarchy of parent client groups and child client groups, each parent client group having a subset of the grouping criteria included by a child client group of the parent client group.

17. The system of claim 12, wherein the client grouping module is further configured to:

receive modified grouping criteria for grouping the plurality of client computing devices; and compare the set of characteristics associated with the first client of the plurality of client computing devices to the modified grouping criteria to obtain a second comparison result.

18. The system of claim 17, further comprising an interface module configured to present a preview of the one or more client groups based on the second comparison result, the preview indicating the clients to be included by each client group of the one or more clients groups upon receiving confirmation of the modified grouping criteria, wherein the client grouping module is further configured to assign the first client to the client group of the one or more client groups based on the second comparison result in response to receiving the confirmation of the modified grouping criteria, wherein the preview indicates that the client group includes the first client.

19. The system of claim 12, wherein the first comparison result indicates that the first client satisfies only a subset of grouping criteria associated with the first client group.

20. The system of claim 12, wherein the set of characteristics can include one or more of the following: an installed software application, a hardware component, a geographic location, a name, a usage pattern, an associated user, a date, an installed agent, and a device classification of a client computing device.

21. The system of claim 12, wherein the configuration rules can include one or more of the following: installation of a software application, installation of an agent, scheduling of a backup operation, and scheduling of a deduplication operation.

* * * * *